United States Patent [19]

Gustafson et al.

[11] Patent Number: 4,813,733

[45] Date of Patent: Mar. 21, 1989

[54] CLAMP-ON GLASS MOLDING

[75] Inventors: Thomas L. Gustafson, Pleasant Ridge; Robert A. Vaughan, Dearborn, both of Mich.

[73] Assignee: The Standard Products Company, Cleveland, Ohio

[21] Appl. No.: 102,385

[22] Filed: Sep. 29, 1987

[51] Int. Cl.$^4$ .............................................. E06B 7/23
[52] U.S. Cl. ...................................... 296/93; 428/122; 52/400; 49/490
[58] Field of Search .................... 428/98, 122; 296/93; 52/400, 403; 49/490

[56] References Cited

U.S. PATENT DOCUMENTS

| | | | |
|---|---|---|---|
| 2,736,404 | 2/1956 | Clingman | 296/93 |
| 2,763,345 | 9/1956 | Clingman et al. | 296/93 |
| 3,705,470 | 12/1972 | Kent . | |
| 4,165,119 | 8/1979 | Hedeen et al. . | |
| 4,358,917 | 11/1982 | Oda et al. . | |
| 4,712,826 | 12/1987 | Omori . | |

FOREIGN PATENT DOCUMENTS

| | | | |
|---|---|---|---|
| 2818755 | 11/1979 | Fed. Rep. of Germany | 428/122 |
| 2582714 | 12/1986 | France . | |
| 60-163720 | 8/1985 | Japan . | |
| 61-132411 | 6/1986 | Japan . | |

Primary Examiner—Alexander S. Thomas
Attorney, Agent, or Firm—Harness, Dickey & Pierce

[57] ABSTRACT

A glass reveal molding has a symmetrical generally C-shaped clamping portion which has a substantially equal amount of mass above and below its center clamping axis and exerts substantially even gripping pressure on both top and bottom surfaces of the glass. The equalized pressure of the clamping portion will substantially eliminate gapping around the radius and retain the molding on the windshield without gapping or rolling of the molding. The molding also has a crown with a stabilizing tail that nests with the C-shaped clamping portion.

8 Claims, 2 Drawing Sheets

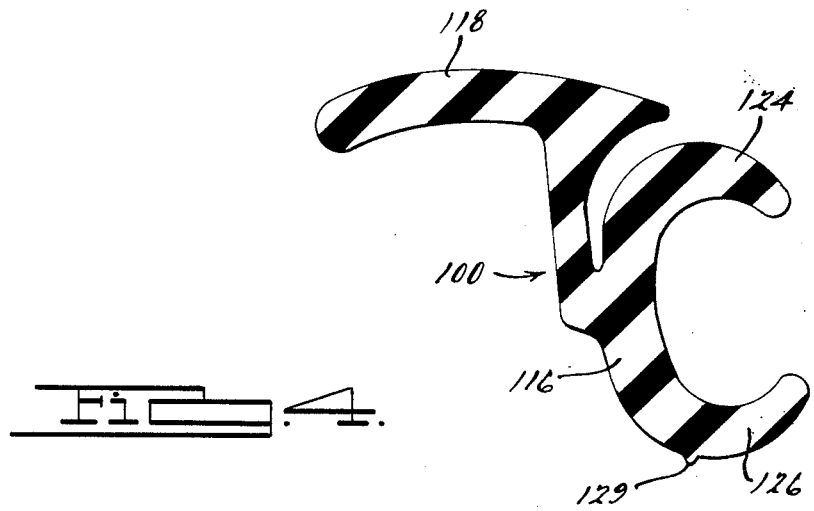
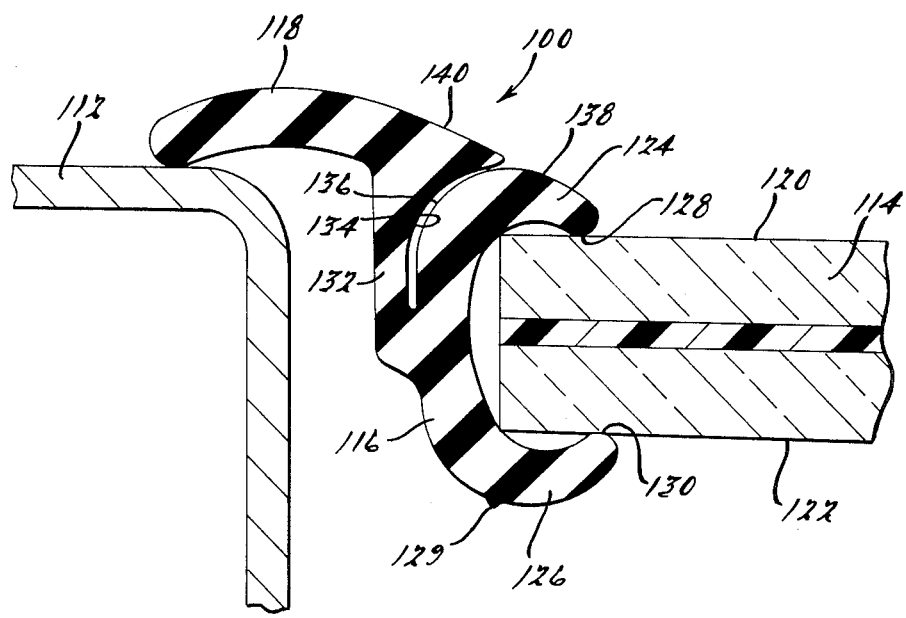

CLAMP-ON GLASS MOLDING

BACKGROUND AND SUMMARY OF THE INVENTION

The present invention relates generally to edge moldings for window panels. More particularly, the present invention relates to a molding for a fixed window of an automobile vehicle such as a windshield or backlite. The molding bridges the space between the edge of the window panel and the adjacent body panel.

Automotive windshields and backlites are commonly mounted to the associated vehicle body in a manner which leaves a space between the periphery of the glass panel and the body panel. This space is covered by a molding referred to as a windshield or backlite reveal molding. In covering the space between the glass panel and vehicle body, a reveal molding serves to improve the visual appearance of the automotive vehicle and reduce wind noise.

To present the best visual appearance, reveal moldings must extend evenly around the space between the glass panel and body panel and must be able to accommodate spaces having varying widths. Reveal molding should also be able to curve around the radius of the glass panel without detaching from the edge of the glass panel or twisting to become disengaged from the glass panel or body panel. Reveal molding also should resist fluttering in the relative wind.

Many molding designs for attachment to the edges of automotive glass panels are of a single piece, asymmetrical construction. When such moldings are attached around the radius of a glass panel edge the clamping pressure of the two opposing molding surfaces is uneven due to the difference of resistance between the mass of material above and below the center axis of the glass. This difference in resistance can cause gapping of one gripper or the other resulting in a loss of uniform gripping about the radius. Loss of gripping can result in detachment of the molding from the glass edge and a rolling of the molding away from the surface of the glass or from the surface of the vehicle body. This result is unsightly and defeats the cosmetic function of the molding as well as increasing the possibility of the molding becoming snagged and pulled out.

In accordance with the present invention, a glass reveal molding has a symmetrical generally C-shaped clamping portion which has a substantially equal amount of mass above and below its center clamping axis and exerts substantially even gripping pressure on both top and bottom surfaces of the glass. The equalized pressure of the clamping portion will substantially eliminate gapping around the radius and retain the molding on the windshield without gapping or rolling of the molding. The molding also has a crown with a stabilizing tail that nests with the C-shaped clamping portion. The tail stabilizer prevents the crown from tilting up or down around the radius of the glass but the tail stabilizer allows the crown to seat against the vehicle body. This is achieved because the tail stabilizer presses against the C-shaped clamping portion when the molding is applied around a radius. Without the tail stabilizer the crown would tip up or down when the molding is applied around a glass radius.

Further understanding of the present invention will be had from the following description of preferred embodiments taken in conjunction with the attached drawings and appended claims.

BRIEF DESCRIPTION OF THE DRAWINGS

FIG. 3 is a cross-sectional view, broken away, of an alternative preferred embodiment of a reveal molding of the present invention in place about a windshield.

FIG. 4 is a cross-sectional view of the molding of FIG. 3 in a relaxed condition.

DESCRIPTION OF THE INVENTION

Figure 1:
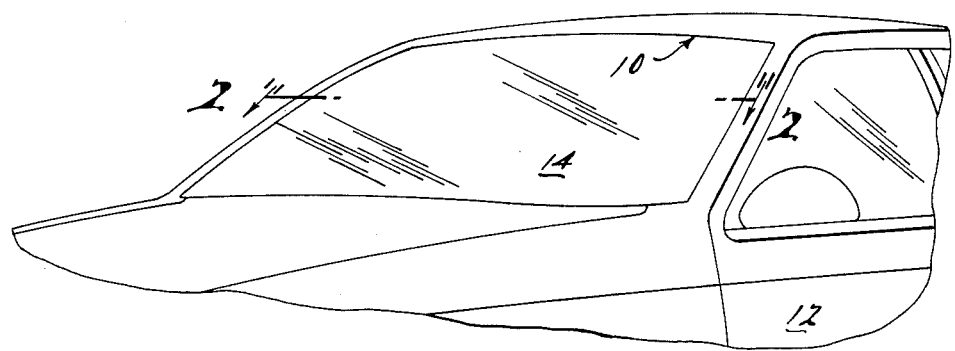
FIG. 1 is a perspective view illustrating a reveal molding of the present invention in place about the periphery of a windshield of an automotive vehicle.
Figure 2:
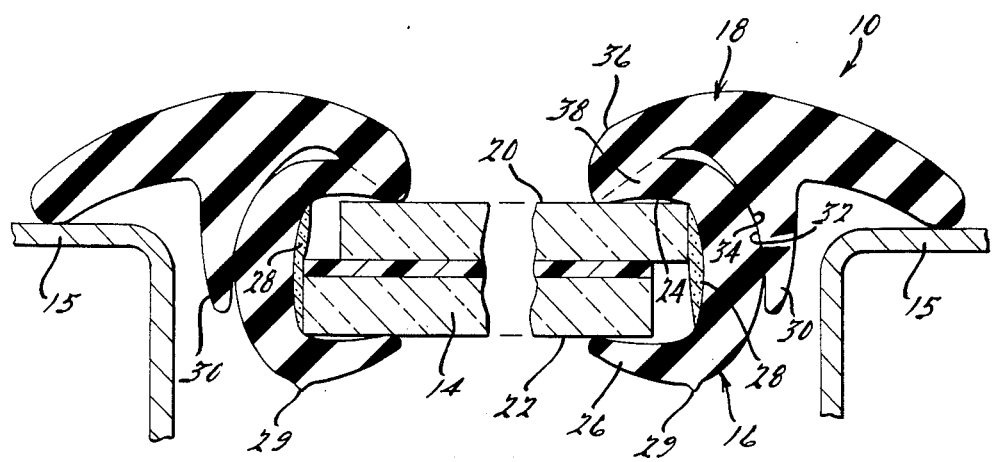
FIG. 2 is a sectional view, broken away, taken along line 2—2 in FIG. 1 and showing a preferred embodiment of a reveal molding of the present invention.

Now referring to FIGS. 1 and 2, a preferred embodiment of a clamp-on glass molding of the present invention is illustrated and indicated generally by the numeral 10. FIG. 1 shows clamp-on glass molding 10 in operative association with automobile 12 as a windshield reveal molding. As shown in FIG. 2 the clamp-on glass molding 10 extends around the sides and top of windshield 14 to cover the space between a conventionally installed windshield 14 and the body panel 15 of automobile 12. It will, of course, be appreciated by those skilled in the art that clamp-on glass molding 10 is well-suited for use as an automotive windshield reveal molding or backlite reveal molding but also has molding uses both inside and outside the automotive field.

Clamp-on glass molding 10 is comprised of a suitable elastomeric material and is an elongated molding broadly comprising, in cross-section, a C-shaped clamping portion 16 and a crown 18, both of which can be comprised of polyvinylchloride or other suitable elastomeric material as is common in the art. For example, clamping portion 16 and crown 18 can be coextruded and comprised of polyvinylchloride of a hardness of durometer shore A 90 and 85 respectively.

C-shaped clamping portion 16 has about an equal amount of mass above and below the central plane of the glass windshield 14. This allows for even clamping pressure on opposite surfaces 20 and 22 by legs 24 and 26 of C-shaped clamping portion 16. This equalized pressure or force of the C-shaped clamping porton 16 reduces the problem of gapping and twisting around the radius of the windshield and enhances retention of the molding on the windshield without rolling or gapping of the molding. Thus, problems with respect to detachment of the molding from the glass edge or a rolling of the molding away from the glass edge are minimized. An adhesive 28 such as a hot melt adhesive can be provided for additional retention of clamp-on glass molding 10 on the edge of windshield 14. The C-shaped clamping portion 16 also includes a bottom nip 29. The bottom nip 29 is located on the neutral axis of C-shaped clamping portion 16 of the clamp-on glass molding 10 when applied to the windshield 14. The bottom nip 29 allows windshield adhesive bonding material to flow around the bottom nip 29 to mechanically lock the clamp-on glass molding 10 in place when the adhesive bonding material hardens.

Crown 18 provides an umbrella-shaped cover which extends across the space between windshield 14 and the adjacent vehicle body 12. Crown 18 must be resilient and flexible so as to maintain an overlaying engagement with the associated vehicle body which may not always be in exact alignment. Crown 18 also has a stabilizing tail 30 extending downwardly from the laterally median portion of crown 18 as viewed in FIG. 2. Tail 30 enhances the resistance of crown 18 to twisting and hence detachment of crown 18 from the glass panel or body panel surface. Tail 30 nests with clamping portion 18 when installed about a windshield. Thus, facing surfaces 32 of crown 18 and 34 of clamping portion 16 are generally contiguous when clamp-on molding 10 is installed. Crown 18 is joined to clamping portion 18 at end 38 of leg 24 of clamping portion 16. The outwardly facing surface 36 of crown 18 can carry a metallized Mylar ® or other bright work as is conventional in the art.

Clamp-on molding 10 is wall-adapted to be a windshield reveal molding. Clamp-on molding 10 can accommodate uneven edges of glass, as is illustrated in FIG. 2 and as is commonly found in the art, without becoming twisted or otherwise disengaged. Furthermore clamp-on molding 10 can be easily installed and is stable once installed to resist disengagement due to temperature extremes, wind, or the like. Clamping portion 16 uniformly engages the glass panel edge while crown 18 uniformly covers the space between the glass panel edge and the body panel edge.

Now referring to FIGS. 3 and 4 an alternative embodiment of the present invention is illustrated and indicated generally by the numeral 100. Clamp-on glass molding 100 is shown in FIG. 3 in operative association with an automotive vehicle body panel 112 and an automotive windshield 114. Clamp-on glass molding 100 broadly comprises a C-shaped clamping portion 116 and a crown 118.

C-shaped clamping portion 116 has arcuate legs 124 and 126 which have end surfaces 128 and 130 clampingly engaged against opposing surfaces 120 and 122 of windshield 114. C-shaped clamping portion 116 is analogous in form and function to clamping portion 16 of clamp-on glass molding 10 and is symmetrical in cross-section with about an equal amount of mass above and below the central plane of windshield 114. The C-shaped clamping portion 126 includes a bottom nip 129. The bottom nip 129 allows the windshield adhesive bonding material to flow around the bottom nip 129 to mechanically lock the clamp-on glass molding 100 in place when the adhesive material hardens.

Crown 118 is generally umbrella-shaped and has a stabilizing tail 132. Tail 132 joins crown 118 to C-shaped clamping section 116 along the central axis thereof so that any forces imparted by crown 118 through tail 132 to C-shaped clamping portion 116 will be applied along the central axis. Tail 132 has an arcuate shoulder 134 which nestingly receives a corresponding arcuate portion 136 of leg 124 of C-shaped clamping portion 116. Surface 138 of leg 124 provides a substantially continuous curved surface with surface 140 of crown 118.

While the above description sets forth preferred embodiments of the present invention, it will be apparent to those skilled in the art that the present invention is subject to modification and variation within the scope and spirit of the following claims.

What is claimed is:

1. A clamp-on reveal molding for edges of glass panels, said molding being elongated and comprising, in cross-section:
   a generally C-shaped clamping portion having inwardly directed clamping legs for exerting a clamping force on opposite surfaces of an edge portion of a glass panel; and
   a generally T-shaped crown having an umbrella-shaped portion with lateral edges and a stabilizing tail portion having a free end, one lateral edge of said crown being joined to an end portion of one leg of said C-shaped clamping portion, said tail portion assuming a nesting relationship with said C-shaped portion and being on a neutral bending axis with one of said lateral edges in compression and the other of said lateral edges in tension when said molding is curved around a radius edge of a glass panel.

2. A molding according to claim 1 wherein said generally C-shaped clamping portion has a nip extending outwardly therefrom.

3. A molding as in claim 1 wherein said molding is comprised of polyvinylchloride.

4. A molding as in claim 3, wherein the outer surface of said crown extends generally continuously with a portion of an outer surface of one of said clamping legs.

5. A molding as in claim 1 wherein said clamping portion is attached to a glass edge with an adhesive.

6. A motor vehicle body having a windshield system, said system having a windshield panel with an elongated molding attached to an edge portion thereof, said molding comprising, in cross-section;
   a generally C-shaped clamping portion having inwardly directed clamping legs exerting a clamping force on opposite surfaces of an edge portion of said panel; and
   a generally T-shaped crown having an umbrella-shaped portion with lateral edge portions and a stabilizing tail portion with a free end, one lateral edge portion of said crown being joined to an end portion of one leg of said C-shaped clamping portion, said tail portion assuming a nesting relationship with said C-shaped portion and being on a neutral bending axis with one of said lateral edges in compression and the other of said lateral edges in tension when said molding is curved around a radius edge of said panel.

7. The system of claim 6 wherein said crown is adhesively joined to said panel.

8. The system of claim 6 wherein one lateral edge portion of said crown contacts a surface of said panel and the other lateral edge portion of mid crown contacts the associated vehicle body.

* * * * *